United States Patent

Kaschel et al.

Patent Number: 5,885,707
Date of Patent: Mar. 23, 1999

[54] SEALABLE LAMINATED FILM CONTAINING COPOLYMERS PRODUCED WITH METALLOCENE CATALYSTS

[75] Inventors: Gregor Kaschel, Walsrode; Heiko Tamke, Bomblitz, both of Germany

[73] Assignee: Wolff Walsrode AG, Walsrode, Germany

[21] Appl. No.: 710,502

[22] Filed: Sep. 18, 1996

[30] Foreign Application Priority Data

Sep. 25, 1995 [DE] Germany ............ 195 35 503.2

[51] Int. Cl.$^6$ ............................ B32B 27/32
[52] U.S. Cl. ............ 428/349; 428/354; 428/412; 428/461; 428/474.7; 428/476.3; 428/483; 428/516
[58] Field of Search ............ 428/412, 461, 428/474.7, 476.3, 483, 500, 515, 516, 523, 537.5, 349, 354

[56] References Cited

U.S. PATENT DOCUMENTS

| | | | |
|---|---|---|---|
| 5,147,678 | 9/1992 | Foerch et al. | 427/40 |
| 5,206,075 | 4/1993 | Hodgson, Jr. | 428/216 |
| 5,491,019 | 2/1996 | Kuo | 428/213 |

FOREIGN PATENT DOCUMENTS

| | | |
|---|---|---|
| 9303093 | 2/1993 | WIPO . |
| 9513321 | 5/1995 | WIPO . |

OTHER PUBLICATIONS

Database WPI, Section Ch, Week 9618, Derwent Publications Ltd., London, GB; Class A17, AN 96–175763 XP002020857 & JP–A–08 053 554 (Sumitomo Chem Co Ltd), (Feb. 27, 1996).

*Primary Examiner*—Paul Thibodeau
*Assistant Examiner*—D. Lawrence Tarazano
*Attorney, Agent, or Firm*—Sprung Kramer Schaefer & Briscoe

[57] ABSTRACT

The present invention relates to a sealable laminated film which contains a copolymer consisting of ethylene and α-olefine, wherein the MPE copolymer is characterized as follows:

polymerised with metallocene catalysts, crystallite melting point less than 110° C., preferably less than 105° C., melt index MFR from 0.5 to 10 g/10 min, molecular weight distribution $M_w/M_n$ less than 3, preferably less than 2.5.

10 Claims, No Drawings und 5,885,707

SEALABLE LAMINATED FILM CONTAINING COPOLYMERS PRODUCED WITH METALLOCENE CATALYSTS

BACKGROUND OF THE INVENTION

Numerous products are packaged in films. Processing on packaging machines frequently necessitates films which are sealable. Great importance is attached to the sealing layer, since it predominantly determines the processing conditions on packaging machines. The strength, the commencement of sealing and the hot tack properties of the film layer are of particular importance here. Not all the requirements imposed on a packaging material can normally be fulfilled by one polymer. Polymers of different kinds are therefore combined. The use of similar polymers is desirable in order to improve the re-use of the film material.

Many films contain sealing layers based on polyethylene or copolymers thereof. Sealing is generally effected by one or two heated sealing jaws, which press the areas to be sealed together for a defined period. The advantage of a polyethylene sealing layer, amongst others, is its low sealing temperature compared with other polymers.

A description and an analysis of the operations during sealing have been given by MEKA/STEHLING (Heat Sealing of Semicrystalline Polymer Films I; J. Appl. Polymer Sci., Vol. 51 (1994), pages 89–103). The sealing curve is described by these authors, amongst other features, by the sealing initiation temperature $T_{Si}$, the temperature at the start of the sealing plateau $T_{pi}$, and the sealing strength in the region of the sealing plateau $SS_p$. In a further article (Heat Sealing of Semicrystalline Polymer Films II; J. Appl. Polymer Sci., Vol. 51 (1994), pages 105–119), STEHLING/MEKA discuss different polymers as sealing layers. They deal in particular with the physical properties of the polymers and their effect on sealing behavior. Thus STEHLING/MEKA state that there is a correlation between the yield point of the film samples obtained and their sealing strength. It is therefore to be expected that sealing layers with high yield points result in high sealing strengths and sealing layers with low yield points result in low sealing strengths. STEHLING/MEKA also state that the sealing initiation temperature for polyethylene can be reduced by the addition of comonomers. However, the yield point, and thus the sealing strength $SS_p$ also, is reduced by the introduction of a comonomer.

According to GNAUCK/FRÜNDT (Einstieg in die Kunststoffchemie [*Introduction to the Chemistry of Plastics*], Carl Hanser Verlag, Munich, 3rd Edition, 1991, pages 59 et seq.), conventional ethylene copolymers rarely contain long-chain branches, and are therefore classed as linear polymers. Their mechanical and thermal properties vary approximately linearly as a function of their density and crystallinity. The properties and uses of these olefin copolymers substantially correspond to those of ethylene homopolymers.

Polyethylene, and copolymers which consist of ethylene and α-olefine, have quite recently been polymerized in the presence of highly stereospecific catalysts. Catalysts such as these are to be found in the group comprising metallocenes, for example. Metallocene catalysts comprise a catalyst system which consists of a soluble metal complex with a defined structure which is fixed on a support material, and the activator (alumoxan). A fundamental definition of this class of substances is given by BEYER/WALTER (Lehrbuch der organischen Chemie [*Textbook of Organic Chemistry*]; Hirzel Verlag Stuttgart 1991, 22nd Edition, page 65 et seq.). A survey of the use of metallocene catalysts in the polymerization of polyolefins is given by M ÜHLHAUPT (Nachr. Chem. Tech. Lab 41 (1993) No. 12, pages 1341–1351). Amongst other topics, the effect of different metallocene catalysts on the polymerization process is described, using polypropylene as an example. Polymers produced with conventional Natta-Ziegler catalysts frequently contain higher concentrations of α-olefines in the low molecular weight fractions. In a further publication (Die angewandte Makromolekulare Chemie [*Applied Macromolecular Chemistry*]227, (1995), No. 3981, pages 159–177) HUNGENBERG ET AL. deal with the synthesis of olefin oligomers and polymers, and with their molecular weights and melting points.

A film consisting of linear polyethylene of low density is described in WO 94/14855. This film consists of ethylene which contains a copolymer and of an α-olefin with 3 to 10 carbon atoms. The density varies from 0.9 to 0.929 g/cm$^3$; the melt flow index measured at 190° C. according to ASTM D-1238, Condition F, varies from 15 to 25 g/10 min; the molecular weight distribution $M_w/M_n$ varies from 2.5 to 3.0, and the crystallite melting point varies from 95° to 135° C. The opacity of the film according to ASTM D-1003 is between 3 and 20. The sealing properties of the film are not mentioned. The catalyst used contains a support material, aluminium oxan, and at least one metallocene.

EP 0572034 describes an ethylenic copolymer and an ethylenic copolymer composition. The melt index MFR is between 0.1 and 30 g/10 min, the density is between 0.88 and 0.94 g/cm$^3$. The catalyst used for the production of the polymers contains metallocenes. The sealing temperatures of flat film specimens are mentioned. Sealing seam strengths and hot tack measurements are not mentioned.

WO 94/26816 describes a copolymer consisting of ethylene and a $C_4$ to $C_{12}$ comonomer with a narrow molecular weight distribution, and describes the production and use thereof, particularly as a stretch film. The catalyst used for the production of the polymers contains metallocenes. Sealing properties and hot tack measurements are not mentioned.

EP 0598626 describes an ethylene/α-olefin copolymer. The catalyst used for the production of the polymers contains at least two specific metallocenes. The polymer composition is characterised by its good thermoforming capacity, its high transparency and its adhesion to polar materials. Sealing properties and hot tack measurements are not mentioned.

Selected ethylene copolymers and ionomers were compared by J.R. DE GARAVILLE (TAPPI Proceedings: 1993, Polymers, Lamination & Coating Conference, pages 525–538) with an ethylene/vinyl acetate copolymer and with some linear polyethylenes of different densities. A copolymer consisting of ethylene and an α-olefin with 4 carbon atoms, which was produced with metallocene catalysts, was also included in the investigation. The results of this study by DE GARAVILLE show that ionomers and acid-modified ethylene copolymers are the most suitable polymers for flexible packaging as regards sealing properties and hot tack performance. The ethylene copolymer produced with metallocene catalysts was distinguished from conventional linear polyethylenes by a broader sealing range coupled with lower sealing strengths. However, a sealable film is desirable which is based on polyethylene and which is compatible with polyethylene. This is not obtained in all cases with ionomers. The object therefore arises of providing a sealable film which corresponds to the following requirements:

1. film consisting of polyethylene or copolymers thereof:
   a polyethylene film is wanted, since polyethylenes are widely used standard plastics. The copolymers used should also predominantly consist of olefins and should be compatible with polyethylene. The concept of the standardization of material is thus addressed.
2. low sealing temperature:
   low sealing temperatures are generally desired, to ensure that packaging materials and filling materials are treated gently. An assessment corresponding to this requirement profile can be made by means of the sealing initiation temperature $T_{si}$.
3. high sealing strength:
   The sealing layer should not only seal at low temperatures but should also exhibit high sealing strengths. The height of the sealing plateau is a measure of the sealing strength; the higher the plateau, the higher the mechanical loading to which the sealing seam can be subjected.
4. high sealing strength directly after sealing:
   A high sealing strength when the sealing seam is still warm is required for a multiplicity of packaging solutions. An examination of the hot tack is a suitable assessment criterion.
5. optical requirements:
   The packaging must not adversely affect the presentation of the contents. A transparent film is generally required. The contents must be visible through the film as true to nature as possible. A suitable assessment criterion for this purpose is the absorption of visible light (haze).

The following definitions are valid within the scope of the invention:

All the cited polymers are commercially available products. For mixtures, the concentration of the individual polymers are given in % by weight unless indicated otherwise. The quoted densities are determined according to ISO 1183 at 23° C. The melt flow index MFR is measured according to ISO 1133 at a temperature of 190° C. and using a bearing weight of 2.16 kg, unless indicated otherwise. The polymers are abbreviated according to the agreed convention. Different polymers of the same class are distinguished by a hyphen and a number (example: LLDPE-2).

The outer layer of the film with the lowest melting point is designated as the "sealing layer". If the outer layers contain polymer mixtures, the outer face of the film which contains the lowest melting component is designated as the sealing layer. The sealing layer is written on the right when quoting film structures, unless indicated otherwise.

Polyethylene of low density which falls within the density range from 0.86 to 0.93 g/cm$^3$ is designated as "LDPE". LDPE molecules are characterised by a high degree of branching.

Linear polyethylenes of low density, which in addition to ethylene contain one or more α-olefins with more than 3 C atoms as comonomers, are designated as "LLDPE". Butene-1, hexene-1, 4-methylpentene-1 and octene-1 can be cited as representatives of α-olefins here. The polymerization of the said substances results in the molecular structure which is typical of LLDPE, and which is characterised by a linear main chain with side chains suspended thereon. The density varies between 0.86 and 0.935 g/cm$^3$. The melt flow index MFR is usually between 0.3 and 8 g/10 min. In some publications, linear ethylene/α-olefin copolymers are subdivided into VLDPEs or ULDPEs according to their density. However, since according to GNAUCK/FRÜNDT (Einstieg in die Kunststoffchemie, Hanser Verlag 1991, page 58) the properties, processing and use of these copolymers substantially correspond to those of ethylene homopolymers, a more precise distinction is dispensed with here.

The term "MPE" here designates an ethylene copolymer which was polymerized by means of metallocene catalysts. An α-olefin with four or more carbon atoms is preferably used as the comonomer. Polymers produced with conventional Natta-Ziegler catalysts frequently contain higher concentrations of α-olefins in the low molecular weight fractions. Metallocene centres, which have a very uniform catalytic action, result in narrow molecular weight distributions, and a very uniform incorporation of α-olefins is observed on fractionation, both in the high and in the low molecular weight fractions. The density is preferably less than 0.92 g/cm$^3$. The molecular weight distribution $M_w/M_n$ is less than 3, preferably less than 2.5.

Copolymers consisting of ethylene and acrylic acid are designated as "EAA", and copolymers consisting of ethylene and methacrylic acid are designated as "EMAA". The ethylene content is preferably between 60 and 99 mole %.

Copolymers consisting of ethylene and vinyl acetate are designated as "EVA". The ethylene content is preferably between 60 and 99 mole %.

The layer or layers situated between the outer faces of the film are designated as "intermediate layer", "bonding layer" or "middle layer". The layers of a film are separated by a "/" stroke. Polymer mixtures are characterised by a "+", the polymers concerned being combined in round brackets. The quantitatively predominant component is named first.

There follows an example of the specified method of writing film structures. The three-layer structure LDPE/LLDPE/(MPE+LLDPE) has LDPE and the mixture (MPE+LLDPE) as its outer layers and LLDPE as its intermediate layer. The sealing layer is the mixture (MPE+LLDPE), wherein the MPE component predominates in relation to the LLDPE component.

SUMMARY OF THE INVENTION

The said object was achieved according to the invention by means of a sealable laminated film containing a copolymer consisting of ethylene and α-olefin, characterised in that the MPE copolymer is characterised as follows:

polymerized with metallocene catalysts, crystallite melting point less than 110° C., preferably less than 105° C., melt index MPR from 0.5 to 10 g/10 min, molecular weight distribution $M_w/M_n$ less than 3, preferably less than 2.5.

The MPE linear ethylene copolymer contained in the sealing layer consists of ethylene and one or more α-olefins with more than 3 C atoms. Butene-1, hexene-1, 4-methylpentene-1 and octene-1 can be cited as representatives of α-olefines here.

DETAILED DESCRIPTION

The film according to the invention can be built up from one or more layers. It is always characterised in that the MPE copolymer is contained within the sealing face. In the films having more than one layer, the sealable surface layer is adhered on one side to one or more thermoplastic layers. The MPE copolymer can be mixed with other polymers based on ethylene, such as LDPE or LLDPE for example. The sealing layer according to the invention which contains MPE or a mixture of MPE with LDPE or LLDPE is designated as "S" although the content of MPE is greater.

TABLE 1

Selection of possible two- or three-layer film structures of the film according to the invention.

| | Film structure | | |
|---|---|---|---|
| No. | Layer i = 3 | Layer i = 2 | Layer i = 1 |
| 1 | — | LDPE | S |
| 2 | — | LLDPE | S |
| 3 | LLDPE | LDPE | S |
| 4 | LLDPE-2 | LLDPE-1 | S |
| 5 | — | (LDPE + LLDPE) | S |
| 6 | — | (MPE + LLDPE) | S |
| 7 | — | (MPE + LDPE) | S |
| 8 | LDPE | (LLDPE + LDPE) | S |
| 9 | LLDPE | (MPE + LLDPE) | S |
| 10 | LDPE-2 | (MPE + LDPE-1) | S |

The layer denoted by i=1 is the sealing layer. The film structures listed do not provide a complete overview of all possible variations.

It must be ensured, particularly when selecting the polymers, that the following equation is satisfied:

$$F_{pi-1} < F_{pi-2} < \ldots < F_{pi} < \ldots < F_{pi-n} \text{(layers } i=1 \ldots n) \quad \text{(Equation 1)}$$

where $F_{pi}$ is the crystallite melting point of the polymer from layer i. The sealing layer (i=1) has the lowest crystallite melting point. If a plurality of polymers is contained in a layer, the crystallite melting point $F_p$ is quoted of the component which requires the highest enthalpy of fusion.

The film thickness preferably falls within the range from 10 μm to 150 μm.

Customary additives may be added to one or more outer layers of the film to improve the packaging. Examples of these include organic or inorganic anti-seizing agents or a slip additive or anti-static agents. Examples of known anti-seizing agents include incompatible organic polymers such as polyesters, polycarbonates and the like, or inorganic substances such as silica (e.g. natural or synthetic hydrated silica) or silicates. Examples of slip additives include fatty alcohols, fatty acid diamides (e.g. oleic or erucic acid amide) or other substances such as those which are cited by PIR- INGER (PIRINGER: Verpackungen für Lebensmittel [*Packagings for Foodstuffs*], VCH Verlagsgesellschaft 1993; see page 53). Anti-static agents which are known from DOMININGHAUS (page 23) include ethoxylated tertiary amines of fatty acids or ethoxylated glycol esters of fatty acids amongst the so-called internal anti-static agents, or quaternary ammonium salts amongst the so-called external anti-static agents.

The sliding capacity is of particular importance for these laminated films. MPE with a crystallite melting point lower than 110° C. generally has a very high coefficient of friction, which can only be reduced by the addition of additives such as anti-seizing agents and slip additives for example.

The film according to the invention is transparent. It can be colored by the addition of colorants. A survey on the topic of colorants is given in DOMININGHAUS (page 26 et seq.). Colorants are usually added in metered amounts to the film via the addition of master batches.

The mixing of different polymers with master batches which contain increased concentrations of additives is advantageously effected by the intensive blending of the granular material before addition to the extruder. The substances are then intensively mixed or the additives are dispersed in the extruder.

The outer face of the film which faces away from the sealing face may be subjected to a physical surface treatment. A distinction is made here between electrical (corona discharge pretreatment) and thermal processes (see G. HABENICHT: Kleben [*Adhesion*], Springer-Verlag Berlin, 1986, page 341 et seq.). By this means the outside of the film is modified in such a way that the adhesive required for laminating purposes adheres better to the outside of the film.

The film according to the invention can also be sealed at low temperatures with a film which contains a sealing layer based on ethylene. The polymers LDPE, LLDPE and EVA or mixtures of these polymers may be cited as examples here. Depending on the substrate used, the film according to the invention can be negatively thermoformed.

The film according to the invention may contain very different substrates. Examples of substrates which can be used include paper, aluminium foil, transparent sheet, biaxially oriented polypropylene (BOPP), biaxially oriented polyalkylene terephthalate, stretched and unstretched polyamide, polycarbonate, polyvinyl alcohol, polystyrene or oriented polystyrene, metallized films and combinations of the said substances. All the substances listed may be of single- or multi-layer structure. The substrates may be coloured, coated or printed and may also be coloured, coated or printed in any combination.

Surprisingly, it is possible to produce very transparent films having excellent sealing properties with the film according to the invention. The said requirements are fulfilled in an exceptional manner by the film according to the invention.

It was not to be expected that the film according to the invention would seal even at low temperatures and at the same time would exhibit very high hot tack strengths. Moreover, it was not to be expected that very high sealing strengths would be obtained despite the low yield point of the sealing layer.

The present invention therefore also relates to the use of the film according to the invention as a sealing layer in combination with very different substrates for the packaging of dry goods (e.g. snack articles, pasta, etc.) or moist products (e.g. meat, cheese, ready-to-serve meals, etc.) or for deep-frozen products (e.g. ready-to-serve meals) or for pharmaceutical products.

Production process

Production of the film according to the invention may be effected in all single- or multi-layer blow-moulding, flat film coating or extrusion laminating installations. It is also possible to combine one or more of the said production processes. The film may be printed on a rotogravure or flexographic printing machine, for example.

Test methods

Determination of the yield point was effected analogously to DIN 53455 from a tensile test on a film strip of width 15 mm. The yield point is the tensile stress at which the gradient of the force/longitudinal deformation curve becomes equal to zero for the first time. The mean value of measurements along and transverse to the direction of travel of the film is quoted.

The sealing strength serves to determine the strength of sealing seams. The sealing strength (SF) is understood to mean the maximum force in N which is necessary in order to separate a sealing seam produced under defmed conditions (pressure, time, temperature). Two defect-free, clean sample strips were taken from the middle of the run. For sealing, they were placed with their faces to be sealed upon one another and were held so that the sample projected by at least 1 cm on each side. Sealing had to be effected at right angles to the direction of travel of the film. To determine the sealing strength, a pressure of 50 N/cm² was employed for a sealing time of 0.5 seconds at the temperature which was preselected in each case. A test strip, of width exactly 15 mm, was cut out from the middle of the sealing seam produced in this manner. The sealing strength of the test strip was investigated on a tensile testing machine, by separating it perpendicular to the direction of travel at a test speed of 100 mm/minute. The maximum value of the force occurring at tearing is quoted.

The definition proposed by STEHLING/MEKA was adopted when quoting the sealing initiation temperature $T_{si}$ and the sealing strength $SS_p$. The sealing initiation temperature is understood to be the temperature at which the sealing strength is greater than 1 N/15 mm. The sealing strength was determined from a graph comprising a plot of all the sealing strengths as a function of temperature, analogously to STEHLING/MEKA (see FIG. 1, page 106).

The hot tack measurement serves for the assessment of sealing seams which are loaded directly after their production. A test strip about 100 mm wide was removed in the direction of travel from the material to be tested. The test spring was placed centrally on the sealing side of the sample. Thereafter, the test strip and the spring were bent jointly together so that the ends of the spring were seated against each other, the test strip gripped tightly around it and the sealing faces at its ends protruding on both sides were superimposed It had to be ensured that the spring ends were just in contact, the test strip was placed tightly round the spring and that sealing was effected directly at the spring ends. As soon as the sealing jaws were closed, the sample was released. The number of the spring is quoted which just resisted the seam. The spring number is a measure of the spring force, which becomes greater with increasing spring number. The spring with the lowest force (spring No. 1) denotes a force of 0.5N and the spring with the highest force (spring No. 8) denotes a force of 5N. The springs with which the sealing seam opened by more than 1 mm are quoted in the Tables.

The opacity is given as the quantity of light in % which leaves the sample after transillumination with a central beam at a solid angle of >8° up to a maximum of 160°. It is quoted with respect to the total quantity of light passing through. The measurement was made according to ASTM Test Standard D 1003-61, Procedure A.

EXAMPLES AND COMPARATIVE EXAMPLES

All the cited polymers are commercially available products. The concentration of the individual polymers in % by weight are given for mixtures, unless indicated otherwise.

TABLE 2

List of the polymers used in the sealing layers

| Polymer | Comonomer | Density g/cm³ | Crystallite melting point °C. | MFR 190° C/2.16 kg g/10min | Molecular weight distribution $M_w/M_n$ |
|---|---|---|---|---|---|
| MPE-1 | octene-1 | 0.902 | 100 | 1 | 2 |
| LDPE-1 | - | 0.923 | 111 | 2 | — |
| LLDPE-1 | octene-1 | 0.920 | 124 | 1.1 | 6.6 |
| LLDPE-2 | octene-1 | 0.915 | 124 | 1.1 | 6.5 |
| LLDPE-3 | butene-1 | 0.919 | 117 | 0.7 | 5.5 |
| EAA-1 | acrylic acid | 0.938 | 99 | 1.5 | — |
| I-1 (Zn type) | methacrylic acid | 0.94 | 94 | 1.8 | 10 |
| EVA-1 | vinyl acetate | 0.928 | 96 | 1.9 | — |

The density of the polymers is given in accordance with ISO 1183. The melt index MFR is given, in accordance with ISO 1133 at 190° C. and with a bearing weight of 2.16 kg, in g/10 min. The crystallite melting point $F_p$ was determined from a DSC (differential scanning calorimetry) measurement. The molecular weight distribution $M_w/M_n$ was determined by means of gel permeation chromatography (GPC).

All sealing layers were produced on a film blowing installation. The film thickness was 50 µm. The blown film contained slip additives and anti-blocking agents (natural hydrated silica and oleic acid amide). The die temperature was 200° C. to 210° C., as was the melt temperature. The blow-up ratio was 2 to 2.3. The die gap width was 0.7 mm. The pull-off speed was between 7 and 10 m/minute. The blown film was adhesively bonded on a laminating machine to an unstretched PA6 flat film of thickness 30 µm or to a PAXXL film of thickness 15 µm. The term PAXXL denotes a coextruded film of thickness 15 µm (structure: PA6/EVOH/PA6), which is stretched monoaxially in the longitudinal direction. The effect of the adhesive can be neglected as regards the fundamental considerations which are applicable here, due to its low thickness (less than 4 µm) compared with the other film layers.

All the films produced in the sense of this invention are denoted by the term "example"; "comparative examples" reflect the prior art.

TABLE 3

First test series

| | Sealing layer 50 µm | 50 µm sealing layer laminated with 30 µm PA 6 film | | | |
|---|---|---|---|---|---|
| Structure | Yield point N/mm² | ($T_{si}$) °C. | ($SS_p$) N/15mm | Hot tack | Haze % |
| Comparative example 1 LLDPE-1 | 9.5 | 110° C. | 47 | 120° C. spring 7 | 15 |
| Comparative example 2 EAA-1 | 6.9 | 90° C. | 31 | 110° C. spring 4 | 8 |
| Comparative example 3 I-1 | 13.6 | 90° C. | 27 | 120° C. spring 4 | 9.1 |
| Example 4 MPE-1 | 3.1 | 90° C. | 38 | 100° C. spring 8 | 5.9 |

The first test series shows the unexpected sealing properties of the MPE compared with other polymers.

TABLE 4

Second test series

| | Sealing layer 50 µm | 50 µm sealing layer laminated with 15 µm PAXXL | | | |
|---|---|---|---|---|---|
| Structure | Yield point N/mm² | ($T_{si}$) °C. | ($SS_p$) N/15mm | Hot tack | Haze % |
| Comparative example 5 LDPE-1 | 9.9 | 110° C. | 24 | 110° C. spring 1 | 9.3 |
| Comparative example 6 (60% LDPE-1 + 40% LLDPE-2) | 8.9 | 110° C. | 24 | 110° C. spring 1 | 9.2 |
| Comparative example 7 | 7.9 | 110° C. | 28 | 110° C. spring 1 | 11 |

TABLE 4-continued

Second test series

| Structure | Sealing layer 50 μm Yield point N/mm² | ($T_{si}$) °C. | 50 μm sealing layer laminated with 15 μm PAXXL ($SS_p$) N/15mm | Hot tack | Haze % |
|---|---|---|---|---|---|
| (50% LLDPE-2 + 50% LLDPE-3) Example 8 (60% LDPE-1 + 40% MPE-1) | 7.9 | 100° C. | 40 | 110° C. spring 4 | 8.3 |

The second test series shows the unexpected, good sealing properties of the mixture comprising 60% LDPE-1 with 40% MPE-1.

TABLE 5

Third test series

| Sealing layer 50 μm Structure | $T_{si}$ °C. | $SS_p$ N/15mm | 50 μm sealing layer laminated with 15 μm PAXXL film Hot tack at 130° C. | Haze % |
|---|---|---|---|---|
| Comparative example 10 LDPE-1/EVA-1 30/20 μm 111° C./96° C. $F_p$ | 100 | 22 | spring 2 | 6.9 |
| Comparative example 11 LDPE-1/LLDPE-3) 30/20 μm 111° C./117° C. $F_p$ | 100 | 35 | spring 1 | 10.7 |
| Example 12 LLDPE-1/MPE-1) 30/20 μm 124° C./100° C. $F_p$ | 90 | 46 | spring 7 | 5.9 |

The third test series shows that the sealing properties can again be improved by the multi-layer film according to the invention if the individual sealing layers are arranged according to Equation 1.

As described above, compared with conventional sealing layers the sealing layer according to the invention provides a significant improvement as regards sealing initiation temperature, sealing strength and hot tack. Based on publications, this was not to be expected. The sealing layer according to the invention constitutes a very advantageous extension of the existing laminated film routine. Thus, for example, the products can be sealed at low temperatures on existing packaging machines and can be processed at higher cycle speeds without impairing the quality of the packaging. These are all advantages from an ecological and economic viewpoint. The sealing layer according to the invention is not restricted to a defined packaging machine, but can be used on all negative thermoforming machines, bag forming and filling machines or other machines which comprise a sealing device. The sealing layer according to the invention is suitable for the packaging of dry goods (e.g. snack articles, pasta, etc.) or moist products (e.g. meat, cheese, ready-to-serve meals, etc.) or for deep-frozen products (e.g. ready-to-serve meals) or for pharmaceutical products.

We claim:

1. A sealable laminated film comprising at least three layers, said film comprising a heat sealable surface layer containing a metallocene-catalyzed ethylene /α-olefin copolymer having a crystalline melting point of less than 110° C., a melt flow index of 0.5 to 10 g/10 min. at 190° C. and 2.16 and a molecular weight distribution ($M_w/M_n$) of less than 3; said sealable surface layer having adhered there to, two or more thermoplastic layers arranged such that the crystalline melting points of each of the layers increase in a direction from the heat sealable layer towards the outermost thermoplastic layer.

2. A sealable laminated film according to claim 1, wherein said metallocene catalyzed copolymer has a density of less than 0.92 g/cm³ and a melt flow index of 0.5 to 5 g/10 min.

3. A sealable laminated film according to claim 1, wherein said sealable surface layer comprises a blend of 40 to 99% by weight of said metallocene catalyzed copolymer and 1 to 60% by weight LDPE.

4. A sealable laminated film according to claim 1, wherein said sealable surface layer comprises a blend of 40 to 99% by weight of said metallocene catalyzed copolymer and 1 to 60% by weight LLDPE.

5. A sealable laminated film according to claim 1, wherein at least one of said thermoplastic layers comprises LDPE, LLDPE, or mixtures thereof.

6. A sealable laminated film according to claim 1, wherein at least one of said thermoplastic layers comprises a mixture of a metallocene catalyzed ethylene α-olefin and either LDPE or LLDPE.

7. A sealable laminated film according to claim 1, wherein the film has printing or has at least one colored layer.

8. A sealable laminated film according to claim 1, wherein the side of the laminated film opposite the heat sealable surface layer is plasma treated.

9. A sealable laminated film according to claim 1, wherein the side of the laminated film opposite the heat sealable surface layer is laminated to a substrate made from a material selected the from the group consisting of paper, aluminum, polypropylene, polyalkylene terephthalate, polyamide, polycarbonate, polyvinyl alcohol, polystyrene, metallized film, and combinations there of.

10. A sealable laminated film according to claim 9, wherein the substrate comprises at least one oriented layer.

* * * * *

UNITED STATES PATENT AND TRADEMARK OFFICE
CERTIFICATE OF CORRECTION

PATENT NO. : 5,885,707
DATED : March 23, 1999
INVENTOR(S) : Gregor Kaschel, et al.

It is certified that error appears in the above-identified patent and that said Letters Patent is hereby corrected as shown below:

Col. 10, Line 15          After "2.16" insert --Kg.,--

Signed and Sealed this

Seventh Day of December, 1999

Attest:

Q. TODD DICKINSON

*Attesting Officer*      *Acting Commissioner of Patents and Trademarks*